United States Patent
Wahlqvist et al.

(10) Patent No.: US 11,323,335 B2
(45) Date of Patent: May 3, 2022

(54) SLA HANDLING IN NETWORK SLICES

(71) Applicant: Telefonaktiebolaget LM Ericsson (publ), Stockholm (SE)

(72) Inventors: Mattias Wahlqvist, Madrid (ES); Göran Hall, Mölndal (SE); Jari Vikberg, Järna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 362 days.

(21) Appl. No.: 16/342,260

(22) PCT Filed: Oct. 18, 2016

(86) PCT No.: PCT/SE2016/051011
§ 371 (c)(1),
(2) Date: Apr. 16, 2019

(87) PCT Pub. No.: WO2018/074953
PCT Pub. Date: Apr. 26, 2018

(65) Prior Publication Data
US 2019/0327153 A1 Oct. 24, 2019

(51) Int. Cl.
*H04L 41/50* (2022.01)
*H04L 41/5003* (2022.01)
*H04L 41/5019* (2022.01)

(52) U.S. Cl.
CPC ...... *H04L 41/5003* (2013.01); *H04L 41/5019* (2013.01)

(58) Field of Classification Search
None
See application file for complete search history.

(56) References Cited

U.S. PATENT DOCUMENTS 10,389,595 B2   8/2019   Houyou et al.
2016/0352645 A1*  12/2016   Senarath .............. H04L 47/41
(Continued)

FOREIGN PATENT DOCUMENTS

| CN | 101442495 A | 5/2009 |
| CN | 104081719 A | 10/2014 |
| EP | 2665310 A1 | 11/2013 |

OTHER PUBLICATIONS

Ericsson, "Radio interface implications of network slicing", 3GPP TSG-RAN WG2 #95bis, Kaohsiung, Taiwan, Oct. 10, 2016, pp. 1-7, Tdoc R2-166931, 3GPP.
(Continued)

*Primary Examiner* — Kodzovi Acolatse
(74) *Attorney, Agent, or Firm* — Coats & Bennett, PLLC

(57) ABSTRACT

Embodiments herein relate to a method performed by a RAN node (12), for managing communication on a first network slice in a communications network (1). The communications network (1) comprises partitioned sets of functionalities. A first set of functionalities belongs to the first network slice. The first set of functionalities is at least 5 partly separated from another set of functionalities out of a total set of functionalities in the communications network (1). The RAN node (12) receives, from a CN node (16), information regarding requested resources for a first network slice identified by a network slice identifier. The RAN node (12) determines that the received information does not correspond to a Service Level Agreement (SLA) for the first network slice.

19 Claims, 11 Drawing Sheets

(56) References Cited

U.S. PATENT DOCUMENTS

| | | | | |
|---|---|---|---|---|
| 2017/0070892 | A1* | 3/2017 | Song | H04W 48/20 |
| 2018/0359688 | A1* | 12/2018 | An | H04W 74/006 |
| 2019/0132781 | A1* | 5/2019 | Arnold | H04W 36/22 |
| 2019/0174498 | A1* | 6/2019 | Samdanis | H04W 16/10 |
| 2019/0174536 | A1* | 6/2019 | Han | H04W 74/002 |
| 2019/0174561 | A1* | 6/2019 | Sivavakeesar | H04W 48/12 |
| 2019/0182752 | A1* | 6/2019 | Lou | H04W 48/06 |
| 2019/0230725 | A1* | 7/2019 | Lou | H04W 76/27 |
| 2019/0281503 | A1* | 9/2019 | Xu | H04L 41/50 |
| 2019/0357122 | A1* | 11/2019 | Li | H04W 76/18 |
| 2021/0160763 | A1* | 5/2021 | Lou | H04W 24/02 |

OTHER PUBLICATIONS

3rd Generation Partnership Project, "3rd Generation Partnership Project; Technical Specification Group Services and System Aspects; General Packet Radio Service (GPRS) enhancements for Evolved Universal Terrestrial Radio Access Network (E-UTRAN) access (Release 13)", Technical Specification, 3GPP TS 23.401 V13.4.0, Sep. 1, 2015, pp. 1-334, 3GPP, France.

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", Technical Specification, 3GPP TS 36.300 V13.1.0, Sep. 1, 2015, pp. 1-254, 3GPP, France.

* cited by examiner

SLA HANDLING IN NETWORK SLICES

TECHNICAL FIELD

Embodiments herein relate to a core network node, a radio network node and methods performed therein for communication. Furthermore, a computer program and a computer readable storage medium are also provided herein. In particular, embodiments herein relate to handling mobility procedures for a wireless device in a communication network having partitioned sets of functionalities.

BACKGROUND

In a typical communication network, wireless devices, also known as wireless communication devices, mobile stations, stations (STA) and/or user equipment (UE), communicate via a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a "NodeB" or "eNodeB". A service area or cell area is a geographical area where radio coverage is provided by the radio network node. The radio network node communicates over an air interface operating on radio frequencies with the wireless device within range of the radio network node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for communication networks, such as e.g. 3G, 4G and 5G networks. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the $3^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface. EPS is the Evolved 3GPP Packet Switched Domain. FIG. 1 is an overview of the EPC architecture. This architecture is defined in 3GPP TS 23.401 v.13.4.0 wherein a definition of a Packet Data Network Gateway (PGW), a Serving Gateway (SGVV), a Policy and Charging Rules Function (PCRF), a Mobility Management Entity (MME) and a wireless or mobile device (UE) is found. The LTE radio access, E-UTRAN, comprises one or more eNBs. FIG. 2 shows the overall E-UTRAN architecture and is further defined in for example 3GPP TS 36.300 v.13.1.0. The E-UTRAN comprises radio access nodes, such as eNBs, Home eNBs, which are also referred to as HeNBs, providing a user plane comprising the protocol layers Packet Data Convergence Protocol (PDCP)/Radio Link Control (RLC)/Medium Access Control (MAC)/Physical layer (PHY), and a control plane comprising Radio Resource Control (RRC) protocol in addition to the user plane protocols towards the wireless device. The radio network nodes are interconnected with each other by means of the X2 interface and/or via an X2 GW. The radio network nodes are also connected by means of the S1 interface to the EPC comprising EPC nodes, such as MME, S-GW and HeNB GateWays (GVV). More specifically the radio network nodes are connected to the MME by means of an S1-MME interface and to the S-GW by means of an S1-U interface.

The S1-MME interface is used for control plane between eNodeB/E-UTRAN and MME. The main protocols used in this interface are S1 Application Protocol (S1-AP) and Stream Control Transmission Protocol (SCTP). S1AP is the application layer protocol between the radio network node and the MME and SCTP for example guarantees delivery of signaling messages between MME and the radio network node. The transport network layer is based on Internet Protocol (IP).

A subset of the S1 interface provided functions are:
  S1-interface management functions such as S1 setup, error indication, reset and the radio network node and MME configuration update.
  UE Context Management functionality such as Initial Context Setup Function and UE Context Modification Function.
  E-UTRAN Radio Access Bearer (E-RAB) Service Management functions e.g. Setup, Modify, Release.
  Mobility Functions for wireless devices in EPS Connection Management (ECM)-CONNECTED, e.g. Intra-LTE Handover and inter-3GPP-Radio Access Technology (RAT) Handover.
  S1 Paging function.
  Non Access Stratum (NAS) Signaling Transport function.

Establishment of the S1-MME interface on S1AP protocol level is performed using an S1 setup procedure. The purpose of the S1 Setup procedure is to exchange application level data needed for the radio network node and the MME to correctly interoperate on the S1 interface. The radio network node may initiate the procedure by sending an S1 SETUP REQUEST message to the MME once it has gained IP connectivity and it has been configured with at least one Tracking Area Indicator (TAI). The TAI(s) are used by the radio network node to locate IP-addresses of the different MMEs, possibly in different MME pools. The radio network node includes its global radio network node identity and other information in the S1 SETUP REQUEST message. The MME responds with an S1 SETUP RESPONSE message. This S1 SETUP RESPONSE message includes for example the Globally Unique MME identifier(s) (GUMMEI) of the MME.

An INITIAL CONTEXT SETUP REQUEST message is sent by the MME to request the setup of a UE context or context of a wireless device. This INITIAL CONTEXT SETUP REQUEST message comprises information related to both the UE context and different E-RABs to be established. For each E-RAB the MME includes E-RAB Quality of Service (QoS) parameters such as QoS Class Identifier (QCI) and Allocation and Retention Priority (ARP). The QCI is a scalar that is used as a reference to radio access node-specific parameters that control bearer level packet forwarding treatment, e.g. scheduling weights, admission thresholds, queue management thresholds, link layer protocol configuration, etc., and that have been pre-configured by the operator owning the radio network node. An INITIAL CONTEXT SETUP RESPONSE message is sent by eNB to the MME confirming the setup. Current assumption is that the RAN-CN split is similar for 5G as for 4G, implying an (evolved) S1 interface.

Radio Resource Control (RRC) States

RRC, which is terminated in the radio network node on the network side from the wireless device, performs functions like:

Broadcast

Paging

RRC connection management

Resource Block (RB) control

Mobility functions

Wireless device measurement reporting and control

The RRC states are:

RRC_IDLE

RRC_CONNECTED

A wireless device is in the RRC_CONNECTED state when an RRC connection has been established between the wireless device and the radio network node. If this is not the case, i.e. no RRC connection is established, the wireless device is in the RRC_IDLE state.

EPS Mobility Management (EMM) and EPS Connection Management (ECM) states

The EPS Mobility Management (EMM) states describe the Mobility Management states that result from the mobility management procedures e.g. Attach and Tracking Area Update procedures.

Two major EMM states are:

EMM-DEREGISTERED

EMM-REGISTERED.

The EPS Connection Management (ECM) states describe the signaling connectivity between the wireless device and the EPC, which includes both RRC connection between the wireless device and radio network node and S1 connection, i.e. S1AP association, between radio network node and MME.

Two major ECM states are:

ECM-IDLE.

ECM-CONNECTED.

In general, the ECM and EMM states are independent of each other. Transition from EMM-REGISTERED to EMM-DEREGISTERED can occur regardless of the ECM state, e.g. by explicit detach signaling in ECM-CONNECTED or by implicit detach locally in the MME during ECM-IDLE. However there are some relations, e.g. to transition from EMM-DEREGISTERED to EMM-REGISTERED the wireless device has to be in the ECM-CONNECTED state.

The wireless communication industry is at the verge of a unique business crossroads. The growing gap between capacity and demand is an urgent call for new approaches and alternative network technologies to enable mobile operators to achieve more with less. Today, mobile broadband data is growing at an annual rate of 40-50 percent per year in the U.S. and other regions globally. Mobile service providers address these rapidly expanding traffic volumes through deployment of additional network functions, which will be a significant capital expenditure (CAPEX) challenge. The nature of the mobile broadband data traffic is also evolving with new services including new video applications, connected cars and the Internet of Things (IoT). This rapid capacity growth and increasing traffic diversity in LTE networks stresses the assumptions of existing network architectures and operational paradigms.

As expected by leading operators and vendors in Next Generation Mobile Networks (NGMN) association, diverse applications or services are expected to be provided by 5G networks. 5G will support countless emerging use cases with a high variety of applications and variability of their performance attributes: from delay-sensitive video applications to ultra-low latency, from high speed entertainment applications in a vehicle to mobility on demand for connected objects, and from best effort applications to reliable and ultra-reliable ones such as health and safety. Furthermore, use cases will be delivered across a wide range of devices, e.g., smartphones, wearables, MTCs, and across a fully heterogeneous environment.

Network Functions Virtualization (NFV) provides a new path that can increase the flexibility required by mobile service providers and network operators to adapt and accommodate this dynamic market environment. NFV is a new operational approach applying well-known virtualization technologies to create a physical Commercial Off-the-Shelf (COTS) distributed platform for the delivery of end-to-end services in the context of the demanding environment of telecom network infrastructure and applications.

Because EPC is critical to the realization and management of all LTE traffic, it is important to consider use cases related to virtualization of the EPC elements. Each individual EPC element also has specific considerations that determine whether to deploy with NFV. Virtualized EPC (vEPC) is a good example: Multiple virtualized network functions (VNF) can be deployed and managed on a Network Functions Virtualization Infrastructure (NFVI) but must cater to performance scalability in both signaling/control plane and user plane, each potentially demanding different levels of NFVI resources.

vEPC elements can benefit from more agile deployment and scalability. However, virtual resource monitoring and orchestration, along with service awareness, are essential for implementing elasticity effectively.

VNF is a virtualized network function which serves as a VNF Software for providing virtual network capabilities. A VNF could be decomposed and instantiated in roles such as Virtualized MME (vMME), Virtualized PCRF (vPCRF), Virtualized SGW (vSGVV) or Virtualized PDN-GW (vPDN-GW).

NFV is seen as an enabler for network slicing and network sharing that is described herein.

When looking at the wide range of applications and use cases that are addressed with a 5G network, it is quite obvious these cannot effectively be addressed with a traditional approach of having a purpose built network for each application. This will lead to high cost for networks and devices as well as inefficient use of valuable frequency resources. Obviously, different use cases put different requirements to future networks. Examples of such requirements may include acceptable interruption time, reliability and availability, acceptable latency, data rate, as well as cost per user. It would be quite difficult or cost-wise impossible to deploy a common network service to fulfill such extremely diverse requirements. In the situation, network slicing was proposed as a concept to fulfill rich requirements from various 5G use cases. Meanwhile, the network slicing concept is getting widely recognition in NGMN. A network slice supports the communication service of a particular connection type with a specific way of handling C-plane and U-plane for the service. A 5G slice could be composed by a collection of 5G network functions and possibly specific RAT with specific settings that are combined together for the specific use case or business model. It should be noted that not all slices contain the same network functions. A specific network service can be instantiated according to on demand requirements for third party users/operators and the business policy between the network service providers and network the service consumers. Thus, an operator may have one physical network infrastructure and one pool of frequency bands, which may support many separate virtualized networks, also called network slices. Each network slice may have unique characteristics for meeting the specific requirements of the use case/s it serves.

A key function of 5G Core network is to allow for flexibility in network service creation, making use of different network functions suitable for the offered service in a specific network slice, e.g. Evolved Mobile Broadband (MBB), Massive Machine Type Communication (MTC), Critical MTC, Enterprise, etc.

In addition to Service optimized networks there are more drivers for Network slicing, such as;

Business expansion by low initial investment: Given the physical infrastructure it is much easier to instantiate another Packet Core instance for the business expansion than to set up a new parallel infrastructure or even integrated nodes Low risk by no/limited impact on legacy: As the new instance is logically separated from the other network slices, the network slices can also provide resource isolation between each other. Thus introduction of a new isolated network slice will not impact the existing operator services and therefore only provide low risk Short Time To Market (TTM): The operators are concerned about the time it takes to set up the network for a new service. Slicing of the network for different services/operator use cases provides a separation of concern that can result in a faster setup of a network slice for a certain service as it is separately managed and with limited impact on other network slices Optimized use of resources: Today the network is supporting many different services but with new use cases and more diverging requirements there is a need for optimize the network for the specific type use case. Network slicing allows to match services to optimized network instances, and it also allows for a more optimized use of those specific resources Allows for individual network statistics: With service specific network slices and possibly even on the level of individual enterprises, there is a possibility of collecting network statistics specific for a limited and well defined group of users of the network slice. This is not the key driver for slicing but rather a benefit that may be a useful tool Slicing can also be used to isolate different services in an operator's network. Future networks are expected to support new use cases going beyond the basic support for voice services and mobile broadband currently supported by existing cellular network, e.g. 2G/3G/4G. Some example use cases include:

Evolution of MBB
   Evolved communication services
   Cloud services
   Extended mobility and coverage
Mission critical Machine Type Communication
   Intelligent traffic systems
   Smart grid
   Industrial applications
Massive Machine Type Communication
   Sensors/actuators
   Capillary networks
Media
   Efficient on-demand media delivery
   Media awareness
   Efficient support for broadcast services These use cases are expected to have different performance requirements, e.g. bit-rates, latencies, as well as other network requirements, e.g. mobility, availability, security etc., affecting the network architecture and protocols.

Supporting these use cases could also mean that new players and business relations are needed compared to existing cellular networks. For instance it is expected that future network should address the needs of Enterprise services
Government services, e.g. national and/or public safety
Verticals industries, e.g. automation, transportation
Residential users These different users and services are also expected to put new requirements on the network. FIG. 3 shows an example of a network slicing for a case when there exists different network slices in the core network for MBB, Massive MTC and Critical MTC. In other words, the network slices may comprise separate core network instances supporting the different network slices. In addition, it is also possible that parts of the EPC are shared between the different network slices. One such example of shared EPC functionality may be a core network node, such as an MME.

Network slicing introduces the possibility for different operators to manage and run the core network slices and the radio access network. This is a new arrangement as normally it has been the same operator managing both the RAN and the CN.

A problem is thus how to ensure that a core network slice associated with a first operator only has access to the functionality, features and/or parameters associated with the first operator.

SUMMARY

An object of embodiments herein is to provide a method for efficiently managing connection requests for a network slice associated with a specific operator in a communications network.

According to an aspect of embodiments herein, the object is achieved by a method performed by a Radio Access Network (RAN) node, for managing communication on a first network slice in a communications network. The communications network comprises partitioned sets of functionalities, wherein a first set of functionalities belongs to the first network slice, and which first set of functionalities is at least partly separated from another set of functionalities out of a total set of functionalities in the communications network. The RAN node receives, from a Core Network (CN) node, information regarding requested resources for a first network slice identified by a network slice identifier. The RAN node further determines that the received information does not correspond to a Service Level Agreement (SLA) for the first network slice.

According to second aspect of embodiments herein the object is achieved by a method performed by a Core Network node, for managing communication on a first network slice in a communications network. The communications network comprises partitioned sets of functionalities, wherein a first set of functionalities belongs to the first network slice, and which first set of functionalities is at least partly separated from another set of functionalities out of a total set of functionalities in the communications network. The CN node transmits, to a Radio Access Network (RAN) node, information regarding requested resources for a first network slice identified by a network slice identifier. The CN node receives, from the RAN node, a rejection of the requested resources, wherein the rejection indicates that the transmitted information does not correspond to the SLA. The rejection further comprises an indication of a reason for requested resources of the first network slice not corresponding to the SLA. The CN node further adapts parameters of the requested resources for the first network slice based on the received indication of the reason for the requested resources of the first network slice not corresponding to the SLA. The CN node then transmits, to the RAN node, a second information regarding the adapted requested resources for the first network slice associated.

According to a third aspect of embodiments herein the object is achieved by a first Radio Access Network (RAN) node, for managing communication on a first network slice in a communications network. The communications network comprises partitioned sets of functionalities, wherein a first set of functionalities belongs to the first network slice, and which first set of functionalities is at least partly separated from another set of functionalities out of a total set of functionalities in the communications network. The RAN node is configured to receive, from a Core Network node, information regarding requested resources for a first network slice identified by a network slice identifier. The RAN node is further configured to determine that the received information does not correspond to a Service Level Agreement (SLA) for the first network slice.

According to a fourth aspect of embodiments herein the object is achieved by a Core Network node, for managing communication on a first network slice in a communication network. The communication network comprises partitioned sets of functionalities, wherein a first set of functionalities belongs to the first network slice, and which first set of functionalities is at least partly separated from another set of functionalities out of a total set of functionalities in the communication network. The CN node is configured to transmit, to a Radio Access Network (RAN) node, information regarding requested resources for a first network slice identified by a network slice identifier. The CN node is configured to receive, from the RAN node, a rejection of the requested resources, wherein the rejection indicates that the transmitted information does not correspond to the SLA. The rejection further comprises an indication of a reason for requested resources of the first network slice not corresponding to the SLA. The CN node is configured to adapt parameters of the requested resources for the first network slice based on the received indication of the reason for the requested resources of the first network slice not corresponding to the SLA. The CN node is further configured to transmit, to the RAN node, a second information regarding the adapted requested resources for the first network slice associated.

It is furthermore provided herein a computer program comprising instructions, which, when executed on at least one processor, cause the at least one processor to carry out any of the methods above, as performed by the first network node or the second network node. It is additionally provided herein a computer-readable storage medium, having stored thereon a computer program comprising instructions which, when executed on at least one processor, cause the at least one processor to carry out the method according to any of the methods above, as performed by the first network node or the second network node.

Embodiments herein introduce an efficient manner of allowing different operators to manage and run the core network slices and the radio network. The RAN may supervise and police that the different core network slices are acting according to the agreed SLAs. This minimizes the impact the different core network slices can have on each other as it ensures that the core network slices act as planned and agreed. The embodiments herein also provides a method for efficiently managing erroneous connection requests in order to quickly establish a connection for a specific network slice.

The embodiments herein may also be used to improve security in the communications network, since the non-correspondence between a request for resources and an SLA may indicate an attack on the communications network, such as e.g. a denial of service (DoS) attack.

BRIEF DESCRIPTION OF THE DRAWINGS

Embodiments will now be described in more detail in relation to the enclosed drawings, in which.

DETAILED DESCRIPTION

Figure 1:
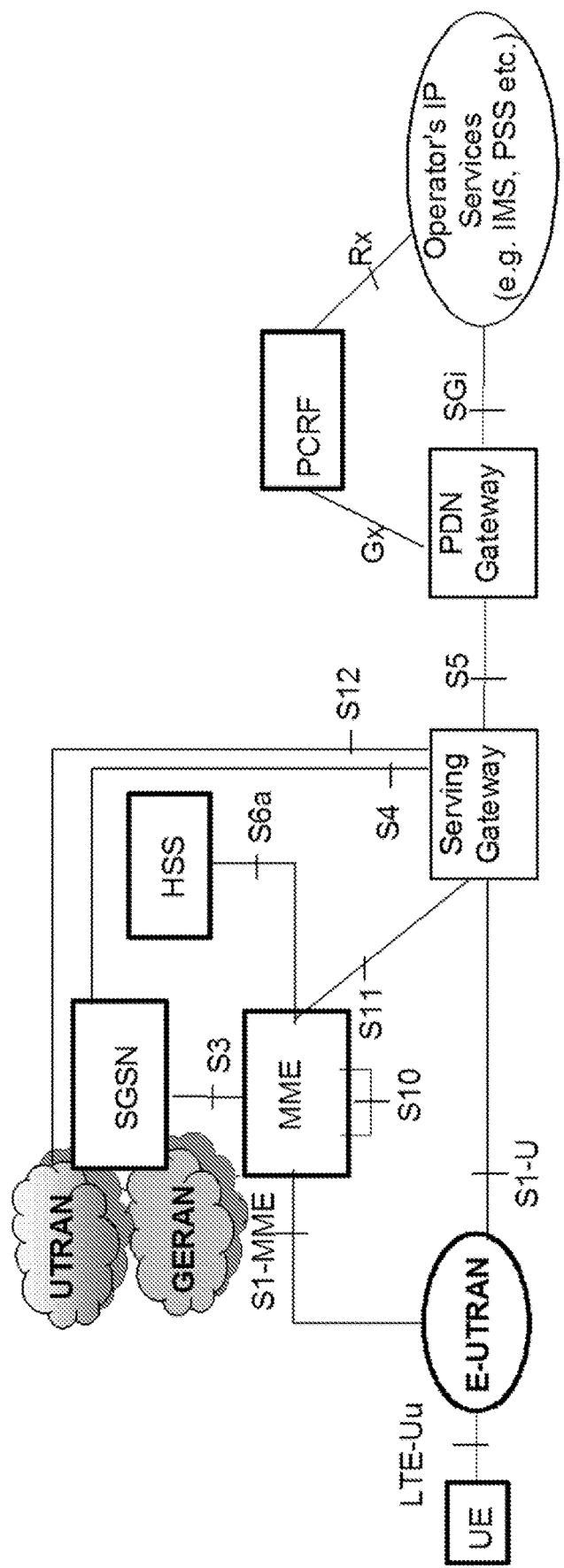
FIG. 1 is a schematic overview depicting a communication network according to prior art.
Figure 2:
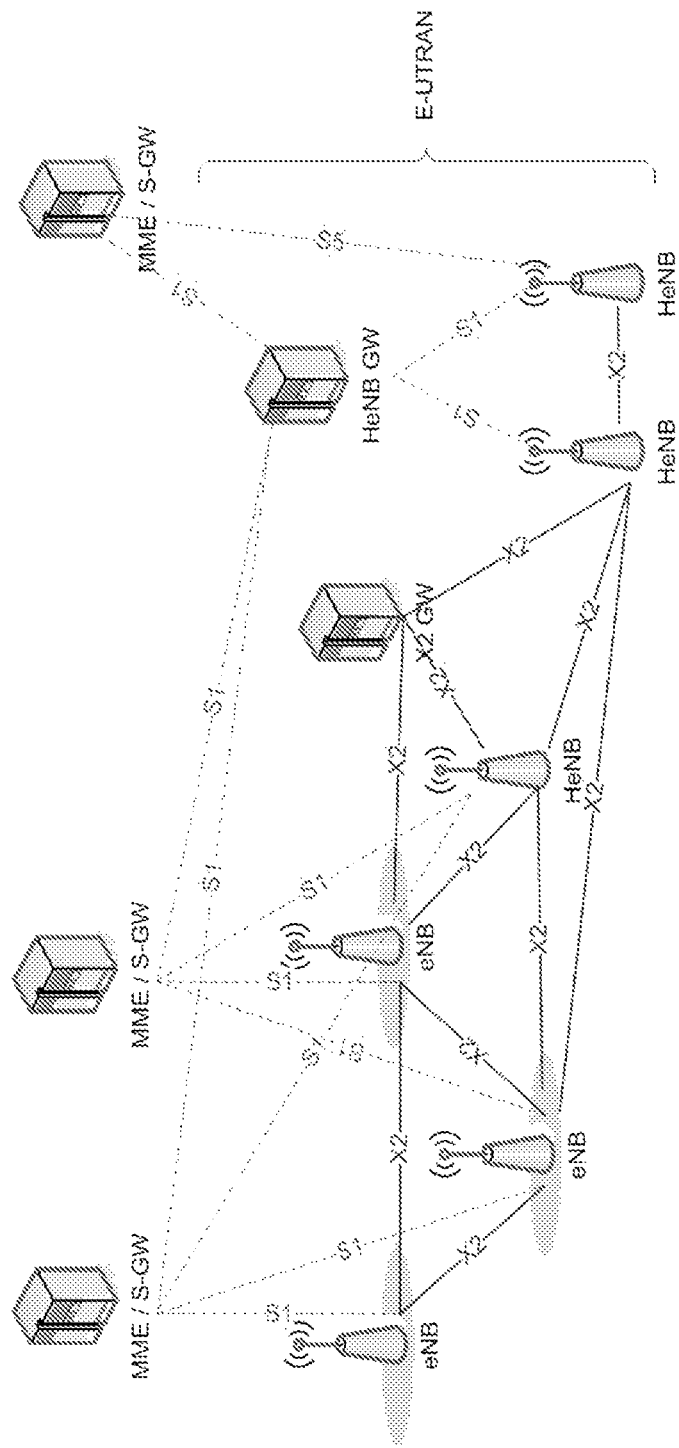
FIG. 2 is a schematic overview depicting a radio access network in connection with a core network.
Figure 3:
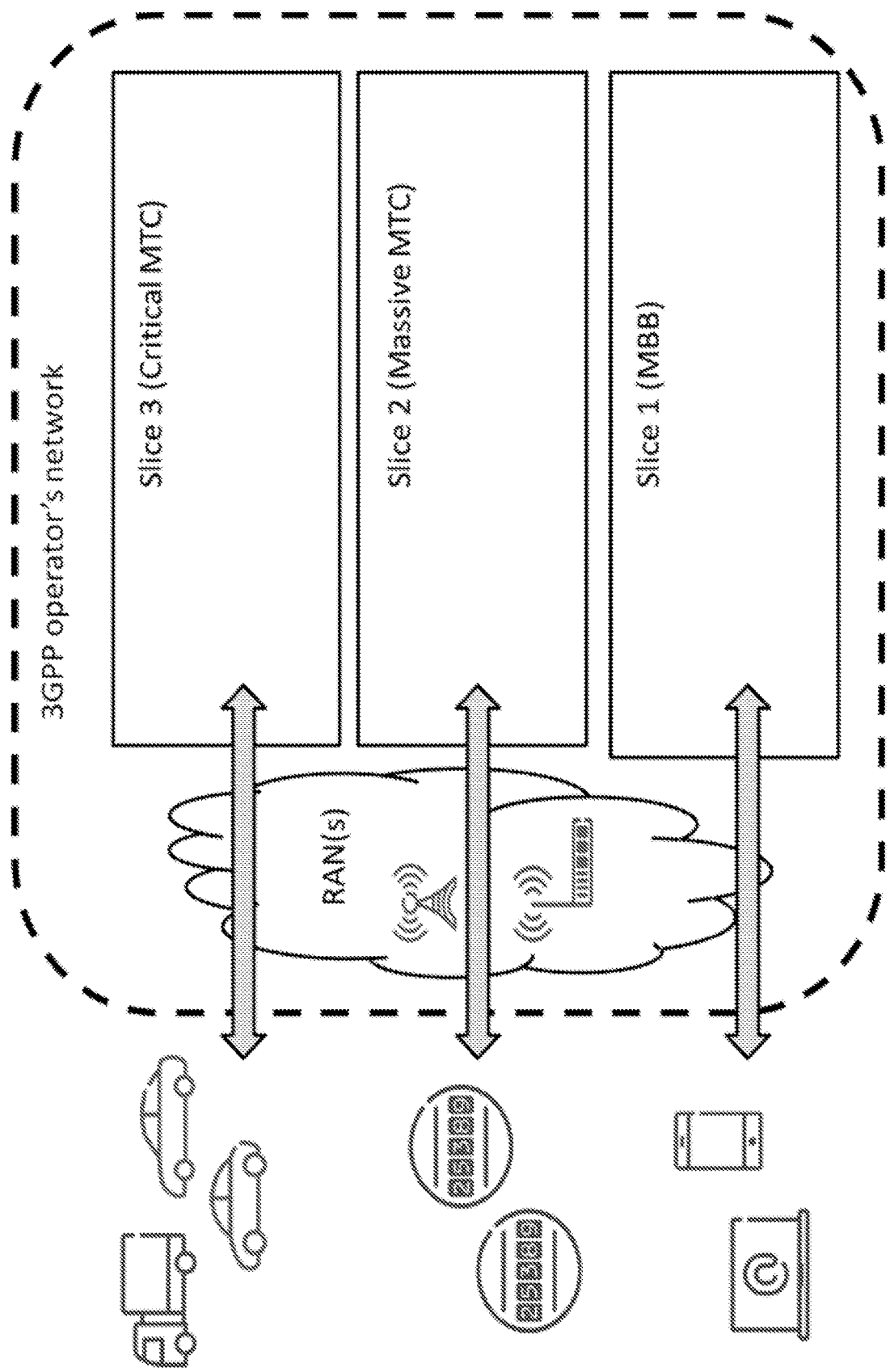
FIG. 3 is a schematic overview depicting an example of network slicing with slice specific core network instances according to prior art.

In network slicing it is a possible scenario that the RAN and the CN will be operated by different operators, or are operated by different organizational units within one operator. In one geographical area, there might be one RAN operator, which offers connectivity services by means of SLAs to several different CN operators, each offering one or several network slices to the end user.

Embodiments herein introduce new functionality in the RAN to supervise and police which functionality, features and/or parameter settings are allowed to be used by a core network slice. For this purpose the RAN is configured with core network slice specific settings about the allowed functionality, features and/or parameter settings. Embodiments herein also relate to the RAN supervising and policing that a specific core network slice acts according to the allowed settings and SLA.

Network slicing is about creating logically separated partitions of the network, addressing different business purposes. These "network slices" are logically separated to a degree that they can be regarded and managed as networks of their own.

The network slicing applies to both LTE based networks and 5G Radio Access Technology (RAT). The network slicing supports business expansion, i.e. improving the cellular operator's ability to serve other industries, e.g., by offering connectivity services with different network characteristics, such as performance, security, robustness, and complexity. One shared Radio Access Network (RAN) infrastructure, comprising one or more RANs, connects to several Evolved Packet Core (EPC) instances, e.g. one EPC instance per network slice. As the EPC functions are being virtualized, it is assumed that the operator shall instantiate a new Core Network when a new slice should be supported.

Network slicing is a new concept that applies to both LTE Evolution and New 5G RAT, which herein may be referred to as New Radio (NR). The key driver for introducing network slicing is business expansion, i.e. improving the operator's ability to serve other industries, by offering connectivity services with different network characteristics, such as e.g. performance, security, robustness, and/or complexity.

The current main working assumption is that there will be one shared RAN infrastructure that will connect to several EPC instances, where one EPC instance relates to a network slice. As the EPC functions are being virtualized, it is assumed that an operator may instantiate a new CN when a new slice should be supported.

Network sharing, which is described in 3GPP TR 22.951 and 3GPP TS 23.251, is a way for operators to share the heavy deployment costs for mobile networks, especially in the roll-out phase. In the current mobile telephony marketplace, functionality that enables various forms of network sharing is becoming more and more important.

A network sharing architecture allows different core network operators to connect to a shared RAN. The operators do not only share the radio network elements, but may also share the radio resources themselves. In addition to this shared radio access network the operators may or may not have additional dedicated radio access networks.

Due to the nature of telecom networks, service Level Agreements (SLA) will be a key issue for a virtualized mobile core network. Because virtualization usually leads to a performance trade-off, equipment vendors must optimize data-plane processing to satisfy carrier-grade bandwidth and latency requirements and sufficient control-plane performance for SLAs needed to ensure availability of regulatory services, such as emergency calls.

Figure 4:
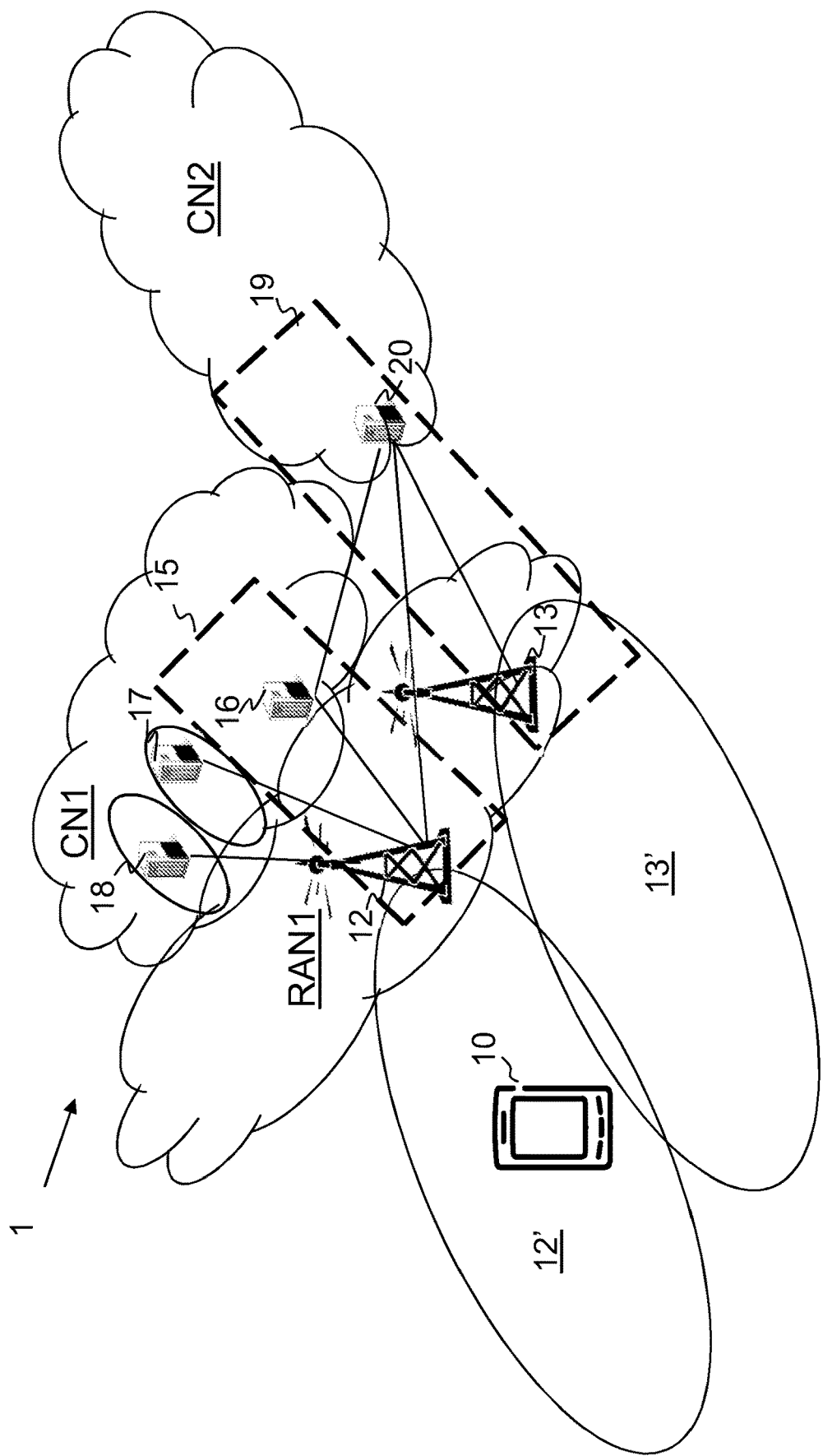
FIG. 4 is a schematic overview depicting a communication network according to embodiments herein.

Embodiments herein relate to communication networks in general. FIG. 4 is a schematic overview depicting a communication network 1. The communication network 1 comprises a RAN and a CN. The communication network 1 may use a number of different technologies, such as Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing communication systems such as e.g. 3G and LTE.

In the communication network 1, wireless devices e.g. a wireless device 10 such as a mobile station, a non-access point (non-AP) STA, a STA, a User Equipment (UE) and/or a wireless terminal, communicate via one or more Access Networks (AN), e.g. RAN, to one or more CNs. It should be understood by those skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a base station communicating within a cell.

The communication network 1 comprises a set of radio network nodes, such as radio network nodes 12, 13 each providing radio coverage over one or more geographical areas, such as a cell 12', 13' of a radio access technology (RAT), such as LTE, UMTS, W-Fi or similar. The radio network node 12, 13 may be a radio access network node such as radio network controller or an access point such as a wireless local area network (WLAN) access point or an Access Point Station (AP STA), an access controller, a base station, e.g. a radio base station such as a NodeB, an evolved Node B (eNB, eNodeB), a base transceiver station, Access Point Base Station, base station router, a transmission arrangement of a radio base station, a stand-alone access point or any other network unit capable of serving a wireless device within the cell, which may also be referred to as a service area, served by the radio network node 12, 13 depending e.g. on the first radio access technology and terminology used. The radio network nodes 12, 13 are comprised in a first radio access network (RAN1) of a first network.

Furthermore, the communication network 1 comprises a first network 15 comprising a first core network CN1 and a second network 18 comprising a second core network CN2. The radio network node 12 may communicate with both the CN1 and the CN2. The first network 15 comprises the first core network CN1. The first network 15 is a virtual network sliced into a number of network slices, the CN1 and/or the RAN1 may be a virtual network sliced into CN slices and/or RAN slices, each network slice or core network slice supports one or more type of wireless devices and/or one or more type of services i.e. each network slice supports a different set of functionalities. Network slicing introduces the possibility that the network slices are used for different services and use cases and these services and use cases may introduce differences in the functionality supported in the different network slices. Each network slice may comprise one or more network nodes or elements of network nodes providing the services/functionalities for the respective network slice. Each slice may comprise a network node such as a core network slice node or a RAN slice node. For example, a first network slice for e.g. MTC devices may comprise a first network slice node 16, a second network slice for e.g. MBB devices may comprise a second network slice node 17 and a third network slice for e.g. Critical MTC devices may comprise a third network slice node 18. The first, the second and the third network slice nodes 16, 17, 18 may however also be combined into one single entity. Each network slice supports a set of functionalities out of a total set of functionalities in the communication network. E.g. the first network slice node 16 supports a first set of functionalities out of the total set of functionalities in the communication network 1. The first set of functionalities is separated from a different set of functionalities out of the total set of functionalities in the communication network 1. E.g. the first set of functionalities being associated with MTC devices is separated or logically separated, e.g. using separated data storage or processing resources, from a second set of functionalities of the second network slice being associated with MBB devices.

The first set of functionalities may use one or more resources in a core or RAN network of the communication network, which one or more resources are separated from other resources used by a different set of functionalities, i.e. different network slices, out of the total set of functionalities in the communication network 1. The resources may then be dedicated or virtually dedicated for each set of functionalities or network slice. Thus, the network slice node may be separated from other network slice nodes supporting a second set of functionalities out of the total set of functionalities in the communication network. Separated meaning herein physically separated wherein the network slice nodes may be executed on different hardware platforms and therefore using different resources of the hardware, and/or logically separated wherein the network slice nodes may be executed on a same hardware platform and use different resources such as memory parts or resources of processor capacity but may also use some same resources of the hardware e.g. a single physical network slice node may be partitioned into multiple virtual network slice nodes.

Hence, the first network slice node 16, which in this scenario is a core network node, supports the first set of functionalities out of the total set of functionalities in a first network 15 of the communication network 1, which first set of functionalities belongs to the first network slice of the first network 15, and is separated from another set of functionalities out of the total set of functionalities in the first network 15. The first network 15 comprises one or more first network nodes, such as the first core network node 16 e.g. Radio Software Defined Networking (SDN) nodes, MMEs, S-GWs, Serving General Packet Radio Services Support Nodes (SGSN), or corresponding nodes in e.g. a 5G network or similar. The first network node may further be a radio access network node such as the first RAN node 12.

A second network 19 comprises one or more second network nodes, such as second core network node 20 e.g. Radio SDN nodes, MMEs, S-GWs, SGSNs, or corresponding nodes in e.g. a 5G network or similar. The second network node may further be a radio access network node such as the first radio network node 13.

Figure 5:
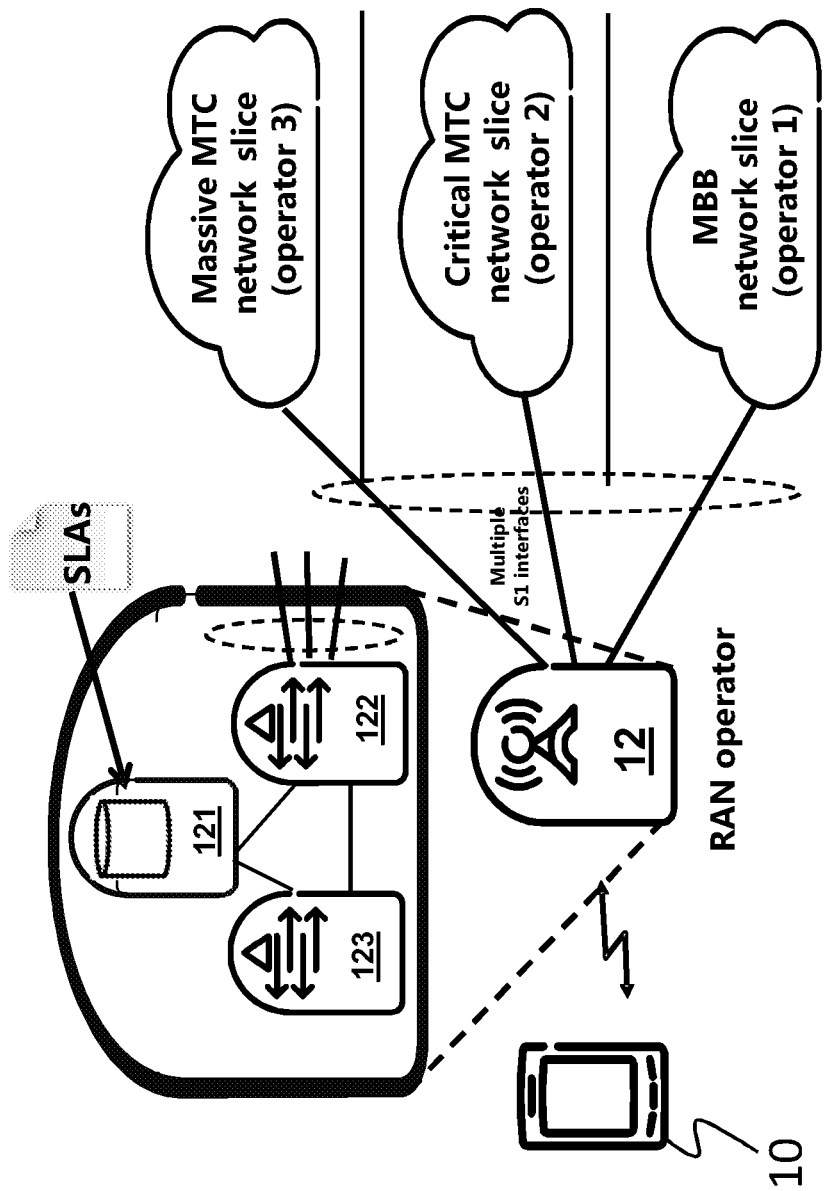
FIG. 5 is a schematic overview depicting a communication network according to an exemplary embodiment herein.

FIG. 5 shows an exemplary overall architecture according to embodiments herein. A single RAN node 12, such as an eNodeB, is shown on the RAN side and is operated by a RAN operator. The RAN node 12 according to an exemplary embodiment herein comprises new functionality which may comprise a SLA database (SLA DB) 121, a supervisor 122 and a policer 123. The SLA database comprises the SLAs between the RAN operator and different core network slice operators. In this embodiment three such core network slices are shown on the core network side. These may be operated by different operators, herein referred to as operators 1-3. The RAN node 12, or in this specific example the supervisor 122 comprised in the RAN node 12, has access to the S1-interface, such as S1-MME for communicating with the core network and S1-U for communicating with the UE 10, and may use this for managing, which may herein also be referred to as supervising, that the signaling and user plane traffic on the S1-interface is according to the SLA. When the RAN node identifies that the S1-interface is not according to the SLA, which may also be referred to as not corresponding to the SLA, the RAN node 12 take different types of actions. In this specific example the supervisor 122 in the RAN node 12 informs the policer 123 in the RAN node 12, which policer 123 may then take different types of actions. According to this exemplary embodiment, the supervisor 122, policer 123 and SLA DB 121 are shown as single functions for all S1-interfaces, it is however also possible to have separate functions, such as e.g. supervisor 122, policer 123 and SLA DB 121, for each S1-interface, or any combination thereof. It may also be possible to integrate the supervisor 122 and policer 123 functionality within the RAN node 12 functionality, for example as a part of S1AP coding and decoding.

The SLA DB 121 comprises the SLAs between the RAN operator and the different core network slice operators. The content comprised in the SLA may be expressed as functionality, features and/or parameter settings visible in the S1-interface. These may comprise different allowed bearer types, such as e.g. if GBR and/or non-GBR bearers are allowed, and allowed Quality of Server Class Identifier (QCI) and Allocation and Retention Priority (ARP) values. Additional examples may e.g. be maximum length of user data packet and maximum bandwidth for a single UE 10. Apart from bearer related parameters, the SLA may also comprise aggregated values applicable for all traffic belonging to a specific network slice, for example a total maximum bandwidth. The SLA may further also comprise limits on signaling events, such as a maximum number of attach requests, Tracking Area Update (TAU) requests, RRC Connection request, etc. In addition the SLA may be expressed in other terms such as daily or weekly time limits, for example that traffic may only be allowed in the night between 00:00 and 05:00, or that traffic may only be allowed on Sundays.

In order to determine if requested resources from the core network node 16 corresponds to the SLA, the RAN node 12 investigates signaling and user data received from a specific core network slice and compares the received information with the SLA settings comprised in the SLA database for the specific core network slice. In some embodiments herein these actions may be referred to as being performed by the supervisor 122. In order to determine that the resources for a specific slice are allowable according to the SLA a slice identifier, such as e.g. a core network slice identifier, may be required. The slice identifier may either be signaled over the S1-interface from a CN node, from the UE 10 and/or may be known by other means such as local configuration in the RAN node 12. The local configuration in the RAN node 12 may be configured via Operations and Maintenance (O&M). Should there be a breach of SLA, meaning that the RAN node 12 detects that the traffic or signaling in the network does not follow the limits defined in the SLA, the RAN node 12 may take necessary actions in order to make sure that a connection is set up which corresponds to the SLA for the network slice. In some embodiments herein the supervisor 122 may send an alarm to the policer 123 function which performs the necessary actions.

There are different possibilities for the actions taken by the RAN node 12 in this case and these depend on for example how the SLA was overridden. In case the overriding, which may also be referred to as the non-correspondence, is related to signaling, the action taken may also be dependent on which type of signaling the overriding S1 signaling was included in. The signaling may e.g. be establishment of the interface between RAN and CN, modification of information related to the interface between RAN and CN, UE context setup in RAN, modification of existing UE context in RAN, handover preparation, such as Handover into this slide allowed, or any signaling comprising information requesting specific functionality in the RAN which information may also be defined and included in an SLA. The non-correspondence may also be related to similar signaling available for the user plane. In some embodiments the policer 123 function may be triggered by the supervisor 122 in case a core network slice is not functioning according to the SLA stored in the SLA database for a specific core network slice.

Possible actions taken by the RAN node 12 and/or the policer 123 function may e.g. be rejection of the related S1 signaling procedure or overwriting and/or changing, which may also be referred to as adapting, the signaled value to a value within the SLA limits. The possibility to reject depends on the S1 signaling procedure used and if such rejection is available for this procedure. When a rejection is possible, a reject cause value may e.g. be "SLA overridden". The adapting, i.e. overwriting and/or changing, may e.g. comprise changing a parameter to a value that is within the SLA, such as e.g. changing the QCI to an allowed value or changing AMBR to an allowed value. In the overwriting/change case it the RAN may inform the core network slice about the new value. Another possible action may be that the RAN node 12, such as e.g. the policer 123 function in the RAN node 12, triggers a reconfiguration of all bearers belonging to a network slice. If for example the total maximum bitrate for the network slice is almost reached, the RAN node 12 may reduce the bit rate for all bearers in that slice. Thereby additional bearers may be added.

The different actions to be taken by the RAN node 12 and/or the policer 123 may also be comprised in the SLA DB 121. This means that when the RAN node 12 or the policer 123 is informed about a specific type of SLA overriding, the action to be taken for this particular overriding may be retrieved from the SLA DB 121.

It should be noted that the specific actions to take may be defined on a case by case basis. In some scenarios, an erroneous reject policy implemented in the RAN node 12 or in the policer 123 function might cause severe disturbances in the network traffic. If for example the RAN node 12 starts rejecting attach requests, or RRC connection requests on broad level, the UE 10 is likely to retry the connection attempt until the connection request is accepted, which might cause an avalanche of connection attempts. To handle such scenarios, the RAN node 12 and/or the policer 123 function may also raise an O&M Alarm instead of taking direct action in the network. The O&M alarm may be sent to the O&M.

The RAN node 12 and/or the supervisor 122 may supervise S1AP signaling on both eNB and UE levels. Any information that may be included and controlled in the S1AP signaling may be specified in the SLA. A typical example of S1AP signaling is the Initial Context Setup procedure when the CN node 16, such as the MME, in a specific core network slice establishes a UE context in the RAN node, such as the eNB, and provides information about the E-RABs to be established. The RAN node 12 and/or the supervisor 122 may check all information in the INITIAL CONTEXT SETUP REQUEST message or any other messages comprising a list of new or modified E-RAB settings.

In addition, the RAN node 12 and/or the supervisor 122 may also examine eNB-level S1AP messages, such as e.g. an S1 SETUP RESPONSE message. When an eNB-level S1AP message comprises any information which is part of the SLA, the RAN node 12 and/or the supervisor 122 may check the contents as described above.

The RAN node 12 and/or the supervisor 122 may further examine user plane packets, such as GTP-U packets received on the S1-U interface from a specific core network slice. One such example is a scenario which may be referred to as "packet marking", i.e. when each user plane packet comprises information about the service or class of service for a packet. If the RAN has implemented a logic which takes into account the "packet marking", such as e.g. in a scheduler, the RAN node 12 and/or the supervisor 122 may check which "packet markings" are allowed for a specific core network slice.

Embodiments herein therefore relate to a method for handling mobility of the wireless device 10 in the communication network 1.

Figure 6:
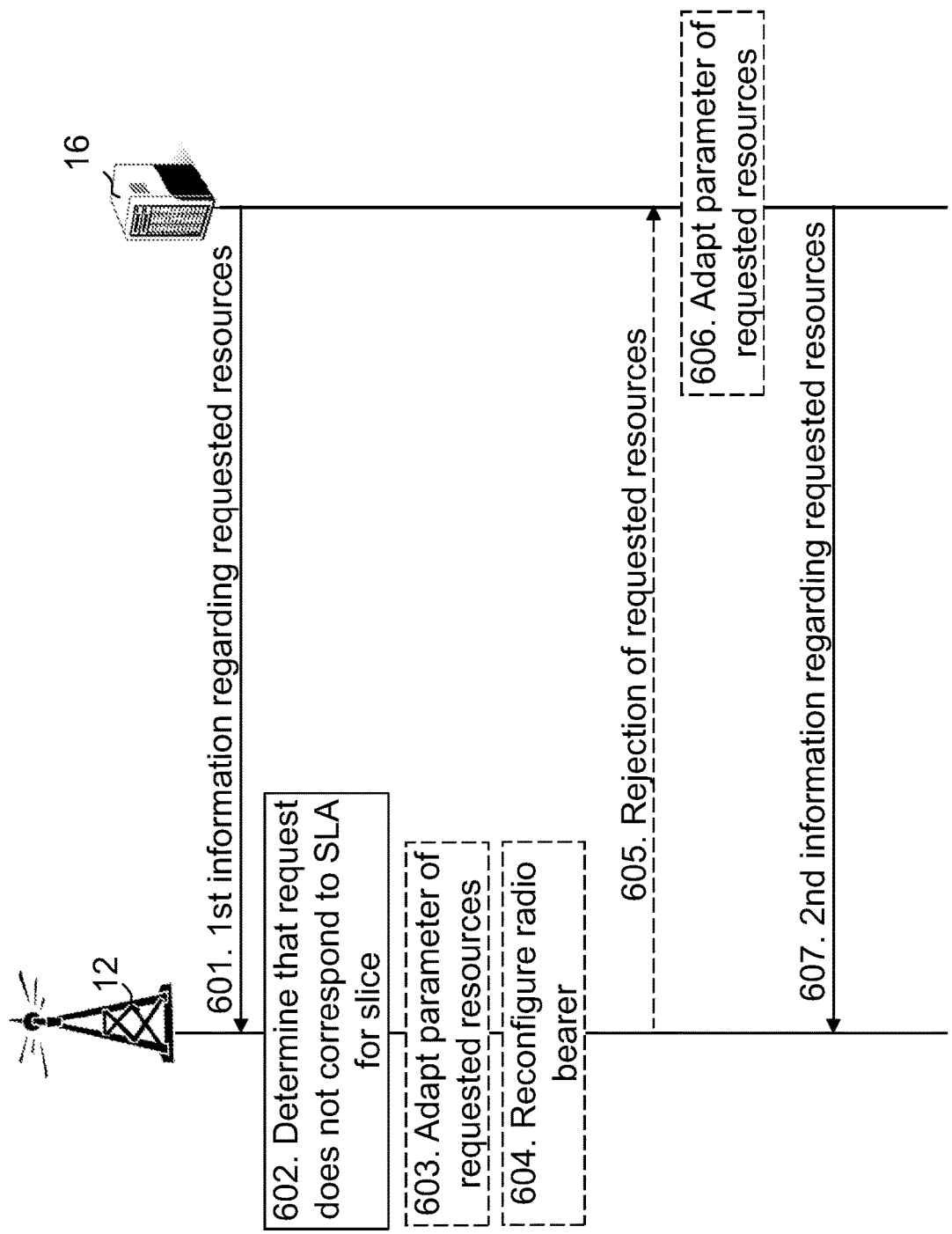
FIG. 6 is a signaling diagram depicting an overview of mobility procedures according to embodiments herein.
Figure 7:
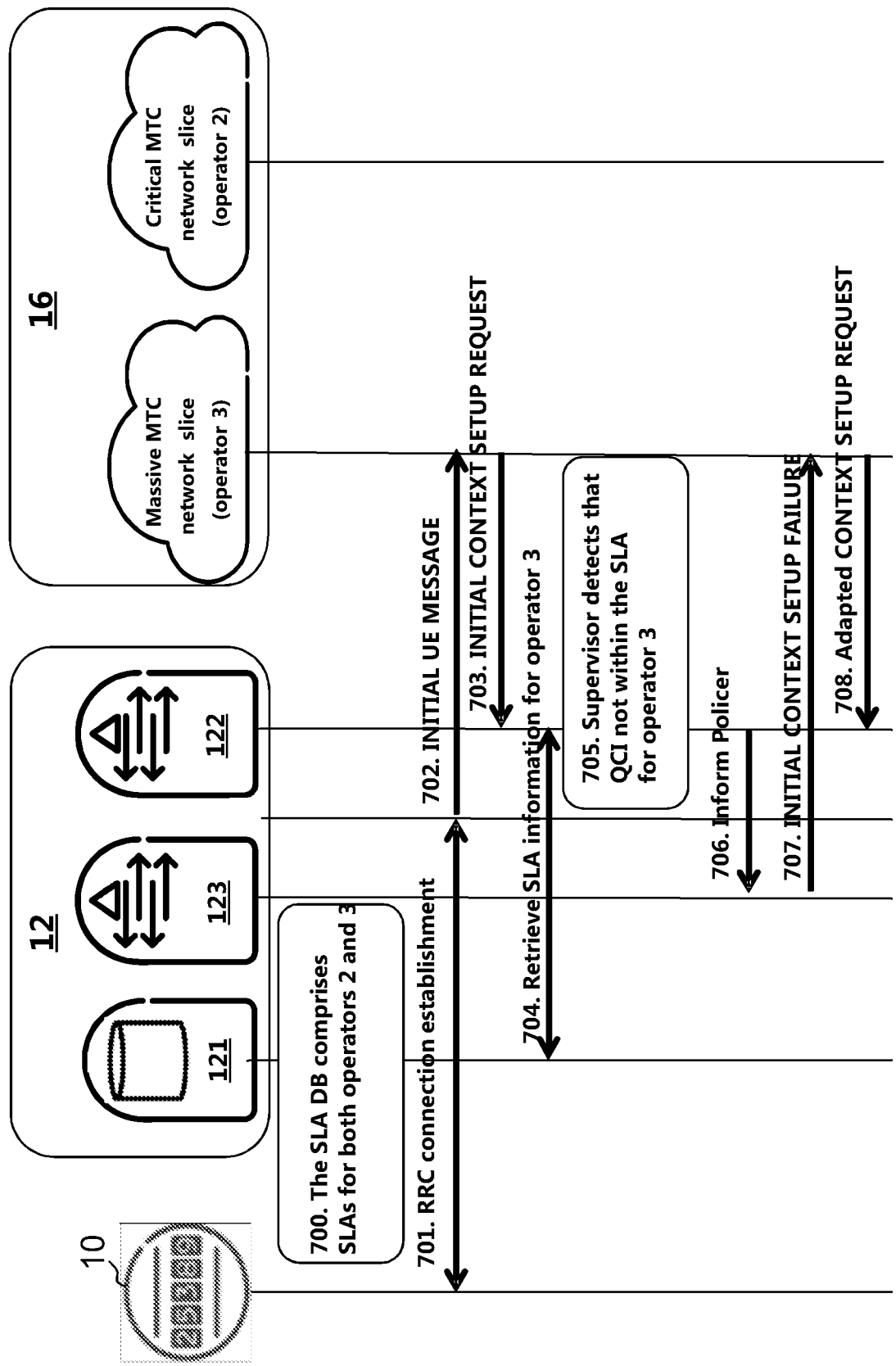
FIG. 7 is a signaling diagram depicting a mobility procedure according to an exemplary embodiment herein.

FIGS. 6 and 7 below disclose examples of the signaling in the communication network according to embodiments herein. FIG. 6 shows an overview of the signaling flow according to the embodiments disclosed herein.

Action 601: The RAN node 12 receives information regarding requested resources for a first network slice from the CN node 16.

The received information may comprise information regarding control plane signalling between the core network node 16 and the RAN node 12 for the first network slice.

The received information may further comprise information regarding control plane signalling between the core network node 16 and a UE 10 for the first network slice.

Figure 8:
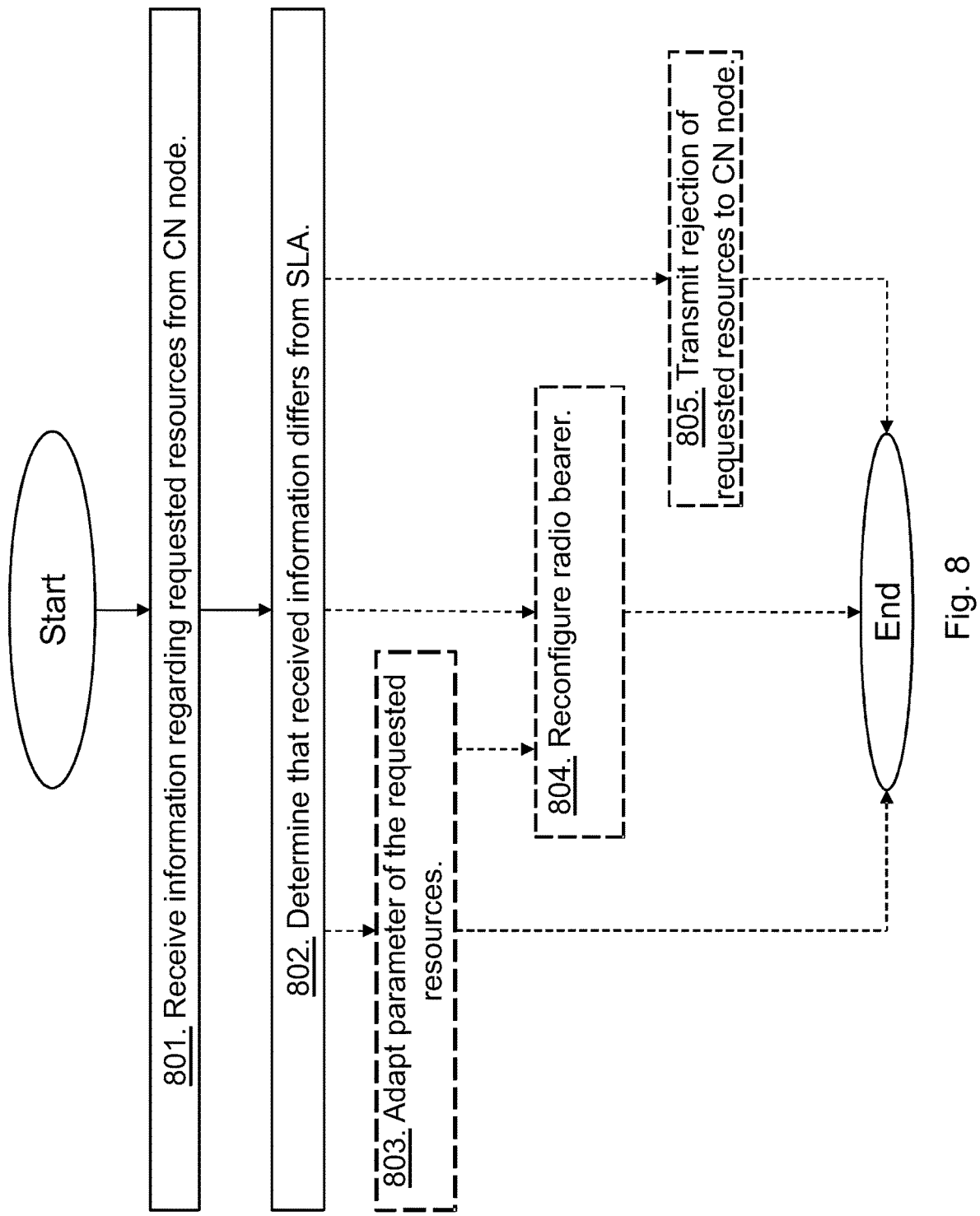
FIG. 8 is a schematic flowchart depicting a method performed by a RAN node according to embodiments herein.
Figure 9:
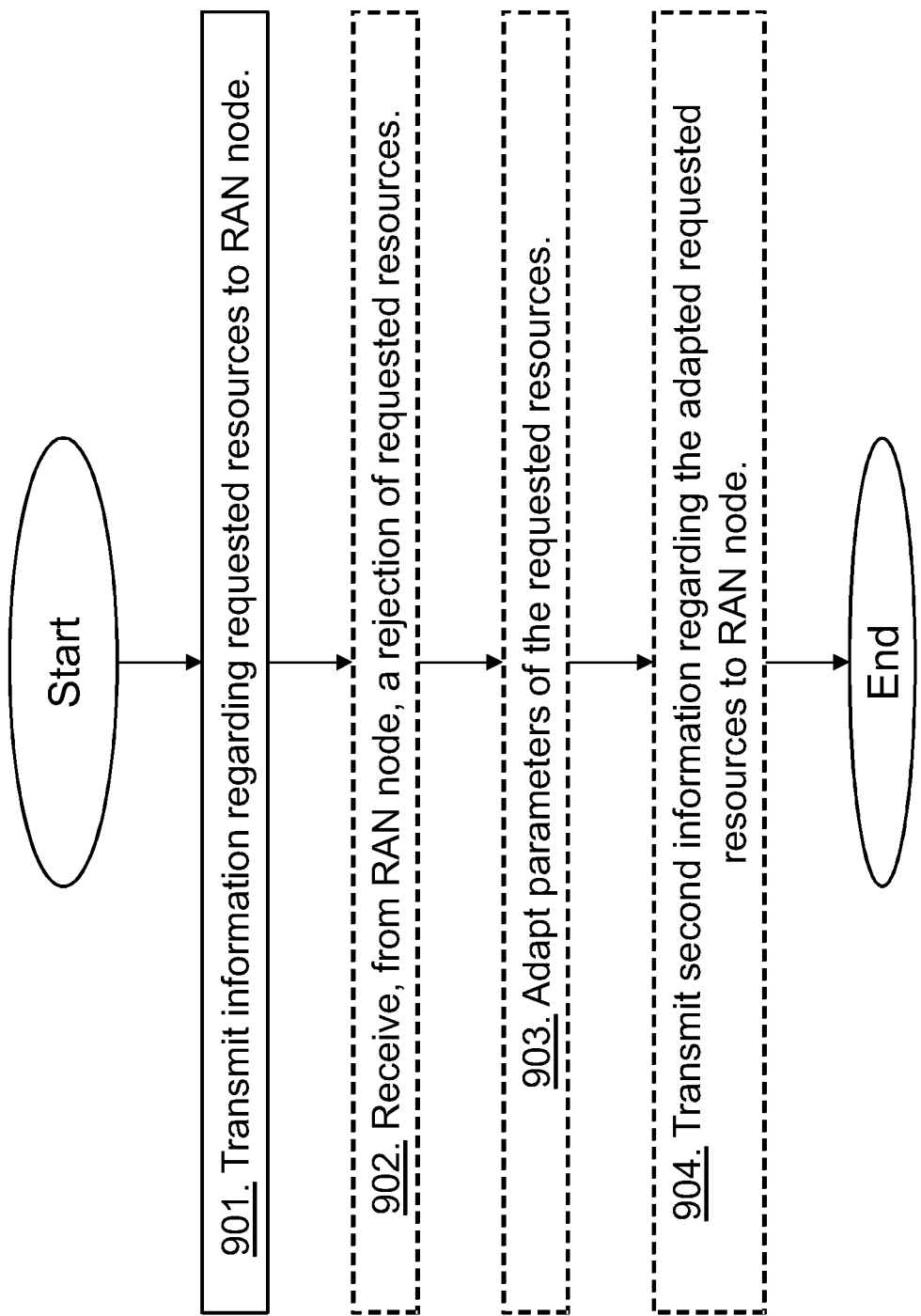
FIG. 9 is a schematic flowchart depicting a method performed by a core network node according to embodiments herein.

This action 601 is similar to action 703 in FIG. 7, action 801 in FIG. 8 and action 901 in FIG. 9.

Action 602: The RAN node 12 determines whether or not the received information corresponds to a Service Level Agreement (SLA) for the first network slice. The reason for not corresponding to the SLA may be that one or more of the UE not being allowed in the first network slice, that there is an overload in the first network slice, that there is an overload in a second network slice, and/or that a limit of a parameter specified in the SLA being reached.

The determining may comprise comparing the received information for the first network slice with the SLA for the first network slice.

This action 602 is similar to action 704-706 in FIG. 7 and action 802 in FIG. 8.

Action 603: According to a first embodiment, when the received information has been determined to not correspond to the SLA for the first slice, the RAN node 12 may adapt a parameter of the requested resources for the first network slice to a value corresponding to the SLA for the first network slice.

This action 603 is similar to action 803 in FIG. 8.

Action 604: According to a second embodiment, when the received information has been determined to not correspond to the SLA for the first slice, the RAN node 12 may reconfigure one or more radio bearers associated with the first network slice, in order for the received information regarding requested resources for the first network slice to correspond to the SLA for the first network slice.

This action 604 is similar to action 804 in FIG. 8.

Action 605: According to a third embodiment, when the received information does not correspond to the SLA for the first slice, the RAN node 12 may in some embodiments transmit a rejection of the requested resources to the CN node 16. The rejection may comprise an indication of a reason for requested resources of the first network slice not corresponding to the SLA.

This action is 605 similar to action 707 in FIG. 7, action 805 in FIG. 8 and action 902 in FIG. 9.

Action 606: The core network node 16 may receive, from the RAN node 12, a rejection of the requested resources. The rejection indicates that the transmitted information does not correspond to the SLA. The rejection further comprises an indication of a reason for requested resources of the first network slice not corresponding to the SLA. The received information comprises information regarding control plane signalling between the core network node 16 and the UE 10 for the first network slice.

This action 606 corresponds to action 903 described with regards to FIG. 9.

Action 607: The core network node 16 may transmit, to the RAN node 12, a second information regarding the adapted requested resources for the first network slice associated with the UE 10.

The transmitted information may comprise information regarding control plane signalling between the core network node 16 and the RAN node 12 for the first network slice.

This action 607 corresponds to action 904 in FIG. 9.

FIG. 7 discloses the signaling flow in the communications network according to an exemplary embodiment herein. In this example the CN node 16 comprises two different core network slices, a Massive MTC slice run by a first operator, herein referred to as operator 3, and a Critical MTC slice run by a second operator, herein referred to as operator 2. The RAN is run by a RAN operator and the shown RAN node, which in this example is an eNB, comprises an SLA Database (DB) 121, the supervisor 122 and the policer 123.

Action 700: In the initial state, the SLA DB 121 comprises SLAs between the RAN operator and a second operator, herein referred to as operator 2, and a third operator, herein referred to as operator 3.

In this example, according to SLAs stored in the SLA DB 121, any UE 12 connected to operator 3, i.e. the Massive MTC network slice, are only allowed to have bearers with QCI value 9.

Action 701: The UE 10 and the RAN node 12 perform an RRC Connection establishment in order to set up the radio bearers for a first slice.

Action 702: The RAN node 12 sends an Initial UE message to the CN node handling the first slice in the core network.

Action 703: The core network of the first slice, in this case the Massive MTC slice, sends an INITIAL CONTEXT SETUP REQUEST to the RAN to create a UE context, which may also be referred to as requesting resources for the UE 10. In the request for resources sent in Action 703 the comprised QCI value of 5.

This action 703 is similar to action 601 in FIG. 6.

Action 704: The RAN node 12 may, in order to determine if the requested resources correspond to the SLA for the slice, retrieve the current SLA for operator 3 from the SLA DB 121. This may e.g. be performed by a determining module, which herein may also be referred to as a supervisor 122.

This action 704 is part of action 602 described with regards to FIG. 6 and action 802 described with regards to FIG. 8.

Action 705: The RAN node 12 determines that the QCI indicated in the request for resources is not according to the SLA for operator 3. This may e.g. be performed by a determining module, which herein may also be referred to as a supervisor 122.

This action 705 is part of action 602 described with regards to FIG. 6 and action 802 described with regards to FIG. 8.

Action 706: The RAN node 12 determines the action to be taken in response to the request for resources not corresponding to the SLA for operator 3. This may e.g. be performed by the determining module or as disclosed herein by informing a policer 123 comprised in the RAN node 12, which may policer 123 may determine the policy for handling the non-correspondence of the requested resources. The RAN node 12 or the policer 123 may contact the SLA DB 121 to retrieve information about the action to be taken. In the scenario disclosed herein the action is a rejection of the UE context setup.

This action 706 is part of action 602 described with regards to FIG. 6 and action 802 described with regards to FIG. 8.

Action 707: The RAN node 12 may transmit a rejection of the requested resources. This rejection may e.g. be an "INITIAL CONTEXT SETUP FAILURE"-message. The rejection may e.g. be transmitted by a transmitting module or as disclosed in FIG. 7 by the policer 123 comprised in the RAN node 12.

This action 707 corresponds to action 605 described with regards to FIG. 6, action 805 described with regards to FIG. 8, and action 902 described with regards to FIG. 9.

Action 708: The core network node 16 may transmit, to the RAN node 12, an adapted CONTEXT SETUP REQUEST comprising information regarding adapted requested resources for the first network slice associated with the UE 10.

This action 708 corresponds to action 607 described with regards to FIG. 6, and action 904 described with regards to FIG. 9.

It should be noted that with the introduction of network slicing in the 3GPP specifications, the UE context setup reject message as disclosed in Action 707 may be modified to include additional cause values in order to also consider network slicing. The additional cause values may e.g. be: "UE not allowed in this slice", "SLA parameter XYZ limit reached", "Overload (in this slice)", "Overload (in another slice)".

Apart from the specific 3GPP standards modifications, the additional cause values may if they are detailed enough, be used by the CN to trigger a new request with adapted parameters which may have a better chance of success. Within the RAN, the different cause values will naturally trigger corresponding counters, but may also be used to trigger functionality such as load balancing, wake/sleep states for energy savings etc.

This action 707 is similar to action 605 described with regards to FIG. 6, action 805 described with regards to FIG. 8, and action 902 described with regards to FIG. 9.

The method actions performed by the Radio Access Network, RAN, node 12, for managing communication on a first network slice in a communication network 1 according to embodiments herein will now be described with reference to a flowchart depicted in FIG. 8. The actions do not have to be taken in the order stated below, but may be taken in any suitable order. Actions performed in some embodiments only are marked with dashed boxes. The communication network 1 comprises partitioned sets of functionalities. A first set of functionalities belongs to the first network slice in the communication network 1. Each set of functionalities belongs to a network slice. The first set of functionalities is at least partly separated from another set of functionalities out of a total set of functionalities in the communications network 1.

Action 801: The RAN node 12 receives, from a CN node 16, information regarding requested resources for a first network slice identified by a network slice identifier.

The received information may comprise information regarding control plane signalling between the core network node 16 and the RAN node 12 for the first network slice.

The received information may further comprise information regarding control plane signalling between the core network node 16 and a UE 10 for the first network slice.

The information may e.g. be received in an S1AP message such as an S1 SETUP RESPONSE message or in user plane packets, such as GTP-U packets received on the S1-U interface from a specific core network slice.

This action 801 is similar to the action 601 described above in relation to FIG. 6, action 703 described above in relation to FIG. 7 and action 901 described below in relation to FIG. 9.

Action 802: The RAN node 12 determines that the received information corresponds to a Service Level Agreement (SLA) for the first network slice. The reason for not corresponding to the SLA may be that one or more of the UE not being allowed in the first network slice, that there is an overload in the first network slice, that there is an overload in a second network slice, and/or that a limit of a parameter specified in the SLA being reached.

The determining may comprise comparing the received information for the first network slice with the SLA for the first network slice.

The SLA may be stored in an SLA database from which the RAN node 12 may retrieve the SLA for the first network slice.

This action 802 is similar to the action 602 described above in relation to FIG. 6 and actions 704-706 described above in relation to FIG. 7.

Action 803: When the received information has been determined to not correspond to the SLA for the first slice, the RAN node 12 may adapt a parameter of the requested resources for the first network slice to a value corresponding to the SLA for the first network slice.

Thereby, the RAN node 12 may set up a connection using the adapted parameters without having to consult the CN node 16.

The adaption of the parameter may e.g. comprise overwriting and/or changing the parameter to a value that is within the SLA, e.g. change of the QCI to an allowed value or changing AMBR to an allowed value.

The RAN node 12 may also inform the core network node 16 about the new value for the requested resources for the core network slice.

This action 803 is similar to the action 603 described above in relation to FIG. 6.

Action 804: When the received information does not correspond to the SLA for the first slice, the RAN node 12 may in some embodiments reconfigure one or more radio bearers associated with the first network slice, in order for the received information regarding requested resources for the first network slice to correspond to the SLA for the first network slice.

The reconfiguration of the radio bearers belonging to a network slice may e.g. comprise lowering the bit rate for all bearers in the specific slice if the total maximum bitrate for the network slice is reached or almost reached. This would allow for additional bearers to be added.

This action 804 is similar to the action 604 described above in relation to FIG. 6.

Action 805: When the received information does not correspond to the SLA for the first slice, the RAN node 12 may in some embodiments transmit a rejection of the requested resources to the CN node. The rejection comprises an indication of a reason for requested resources of the first network slice not corresponding to the SLA. The rejection may be a rejection of a related S1 signaling procedure. A typical reject cause value may e.g. be "SLA overridden".

This action 805 is similar to the action 605 described above in relation to FIG. 6, action 707 described above in relation to FIG. 7 and action 902 described above in relation to FIG. 9.

The RAN node 12 may determine to perform one or more of the specific actions 803 to 805 on a case by case basis. In some scenarios, an erroneous reject policy implemented by the RAN node 12 may cause severe disturbances in the network traffic. This may e.g. be the case if the policer 123 function starts rejecting attach requests, or RRC connection requests on broad level, since the UE 10 may retry sending setup request until the connection is successfully established. This may cause an overload in the network and furthermore the UE 10 may be out of service while sending the setup requests.

The method actions performed by the core network node 16, for managing communication on a first network slice in a communications network 1 according to embodiments herein will now be described with reference to a flowchart depicted in FIG. 9. The actions do not have to be taken in the order stated below, but may be taken in any suitable order. Actions performed in some embodiments are marked with dashed boxes. The communication network 1 comprises partitioned sets of functionalities. Each set of functionalities belongs to a network slice. Each set of functionalities is separated from other sets of functionalities out of a total set of functionalities in the communication network. A first set of functionalities belongs to the first network slice. The first set of functionalities is at least partly separated from another set of functionalities out of a total set of functionalities in the communications network 1.

Action 901: The core network node 16 transmits to a RAN node 12, information regarding requested resources for a first network slice identified by a network slice identifier.

This action 901 is similar to the action 601 described above in relation to FIG. 6, action 701 described above in relation to FIG. 7 and action 801 described above in relation to FIG. 8.

Action 902: The core network node 16 may receive, from the RAN node 12, a rejection of the requested resources. The rejection indicates that the transmitted information does not correspond to the SLA. The rejection further comprises an indication of a reason for requested resources of the first network slice not corresponding to the SLA. The received information comprises information regarding control plane signalling between the core network node 16 and a UE 10 for the first network slice.

This action 902 is similar to the action 605 described above in relation to FIG. 6, action 707 described above in relation to FIG. 7 and action 805 described above in relation to FIG. 8.

Action 903: The core network node 16 may adapt parameters of the requested resources for the first network slice based on the received indication of the reason for the requested resources of the first network slice not corresponding to the SLA.

This action 903 is similar to the action 606 described above in relation to FIG. 6.

Action 904: The core network node 16 may further transmit, to the RAN node 12, a second information regarding the adapted requested resources for the first network slice associated with the UE 10.

The transmitted information may comprise information regarding control plane signalling between the core network node 16 and the RAN node 12 for the first network slice.

This action 904 is similar to the action 607 described above in relation to FIG. 6.

Figure 10:
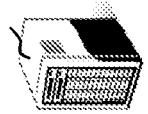
FIG. 10 is a block diagram depicting a RAN node according to embodiments herein.
Figure 10:
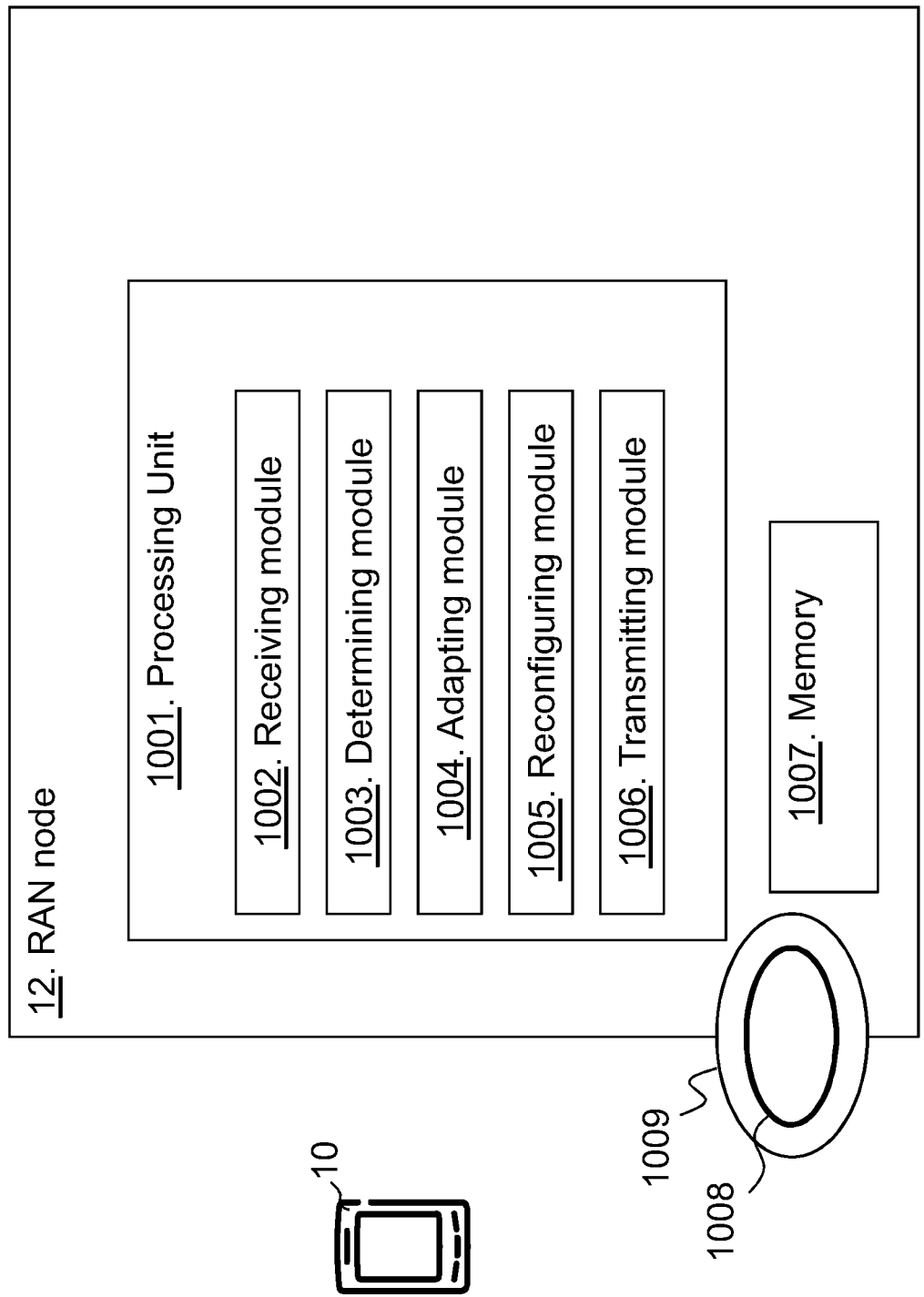

FIG. 10 is a block diagram depicting the Radio Access Network (RAN) node, for managing communication on a first network slice in a communications network 1. The communications network 1 comprises partitioned sets of functionalities, wherein a first set of functionalities belongs to the first network slice. The first set of functionalities is at least partly separated from another set of functionalities out of a total set of functionalities in the communications network.

The RAN node 12 may comprise a processing unit 1001, such as e.g. one or more processors, configured to perform the methods described herein.

The RAN node 12 is configured to, e.g. by means of a receiving module 1002 and/or the processing unit 1001 being configured to, receive, from a CN node 16, information regarding requested resources for a first network slice identified by a network slice identifier.

The received information may comprise information regarding control plane signalling between the core network node 16 and the RAN node 12 for the first network slice.

The received information may further comprise information regarding control plane signalling between the core network node 16 and a UE 10 for the first network slice.

The RAN node 12 is configured to, e.g. by means of a determining module 1003 and/or the processing unit 1001 being configured to, determine whether or not the received information corresponds to a Service Level Agreement (SLA) for the first network slice. The RAN node 12 may be configured to determine by being configured to compare the received information for the first network slice with the SLA for the first network slice.

The RAN node 12 may further be configured to, e.g. by means of an adapting module 1004 and/or the processing unit 1001 being configured to, when the received information does not correspond to the SLA for the first slice, adapt a parameter of the requested resources for the first network slice to a value corresponding to the SLA for the first network slice.

The reason for not corresponding may be one or more of:
the UE 10 not being allowed in the first network slice,
an overload in the first network slice,
an overload in a second network slice, and
a limit of a parameter specified in the SLA being reached.

The RAN node 12 may further be configured to, e.g. by means of a reconfiguring module 1005 and/or the processing unit 1001 being configured to, when the received information does not correspond to the SLA for the first slice, reconfigure one or more radio bearers associated with the first network slice, in order for the received information regarding requested resources for the first network slice to correspond to the SLA for the first network slice.

The RAN node 12 may further be configured to, e.g. by means of a transmitting module 1006 and/or the processing unit 1001 being configured to, transmit, a rejection of the requested resources to the CN node, which rejection comprises an indication of a reason for requested resources of the first network slice not corresponding to the SLA, when the received information does not correspond to the SLA for the first slice.

The RAN node 12 further comprises a memory 1007. The memory comprises one or more units to be used to store data on, such as system information, IDLE mode mobility information, network slice information, wireless device IDs, network slice and roaming policies, Slice IDs, applications to perform the methods disclosed herein when being executed, and similar.

The methods according to the embodiments described herein for the first radio network node 12 are respectively implemented by means of e.g. a computer program 1008 or a computer program product, comprising instructions, i.e., software code portions, which, when executed on at least one processor, cause the at least one processor to carry out the actions described herein, as performed by the RAN node 12. The computer program 1008 may be stored on a computer-readable storage medium 1009, e.g. a disc or similar. The computer-readable storage medium 1009, having stored thereon the computer program, may comprise the instructions which, when executed on at least one processor, cause the at least one processor to carry out the actions described herein, as performed by the RAN node 12. In some embodiments, the computer-readable storage medium may be a non-transitory computer-readable storage medium.

Figure 11:
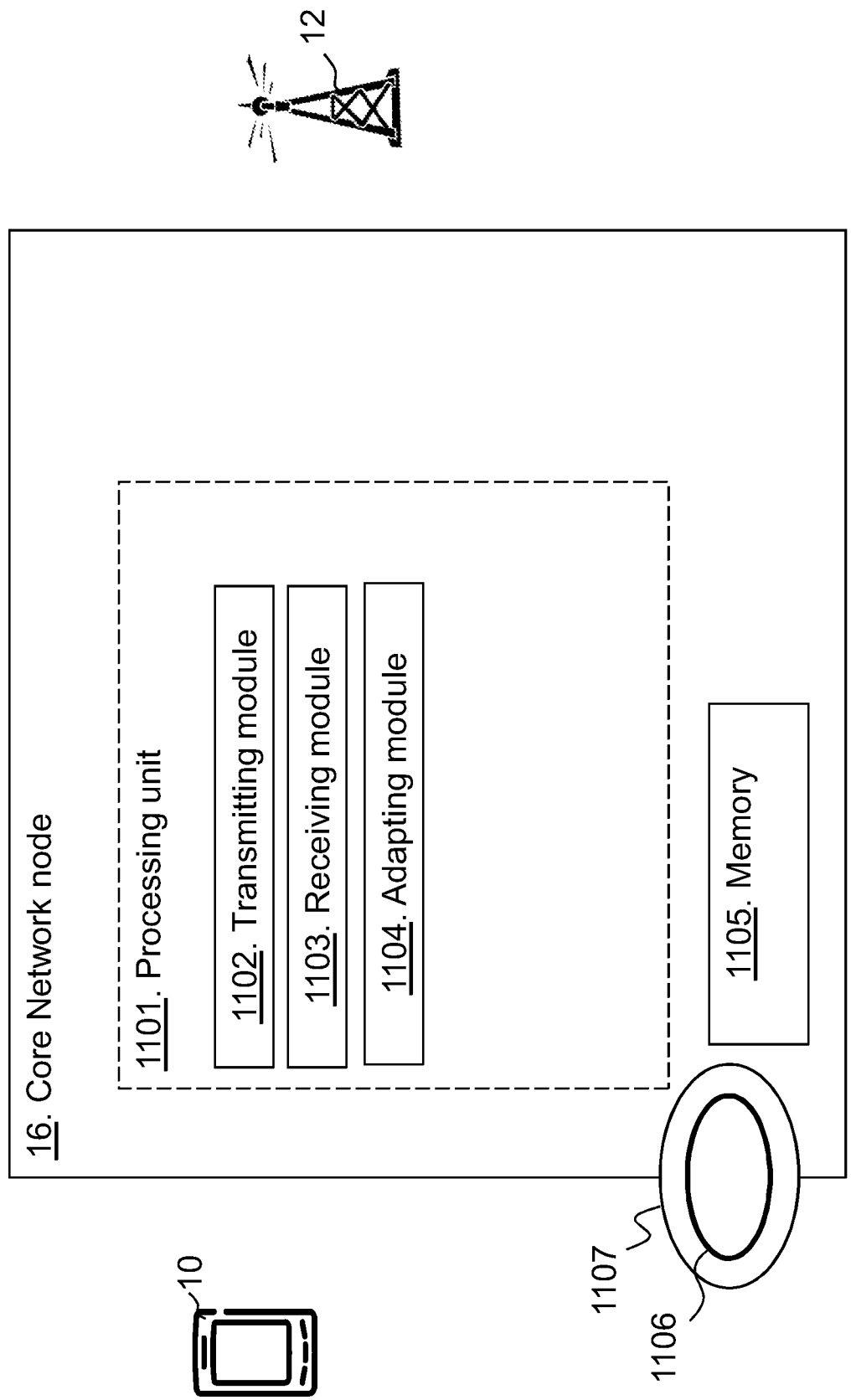
FIG. 11 is a block diagram depicting a core network node according to embodiments herein.

FIG. 11 is a block diagram depicting the CN node 16, for managing communication on a first network slice in a communication network 1. The communication network 1 comprises partitioned sets of functionalities, wherein a first set of functionalities belongs to the first network slice. The first set of functionalities is at least partly separated from another set of functionalities out of a total set of functionalities in the communication network 1.

A first set of functionalities belongs to a first network slice supporting the wireless device 10. The core network node 16 may comprise a processing unit 1101, e.g. one or more processors, configured to perform the methods described herein.

The core network node 16 is configured to, e.g. by means of a transmitting module 1102 and/or the processing unit 1101 being configured to, transmit to a Radio Access Network (RAN) node 12, a first information regarding requested resources for a first network slice identified by a network slice identifier.

The transmitted information may comprise information regarding control plane signalling between the core network node 16 and the RAN node 12 for the first network slice.

The core network node 16 is configured to, e.g. by means of a receiving module 1103 and/or the processing unit 1101 being configured to, receive from the RAN node 12, a rejection of the requested resources. The rejection indicates that the transmitted information does not correspond to the SLA. The rejection further comprises an indication of a reason for requested resources of the first network slice not corresponding to the SLA.

The received information may comprise information regarding control plane signalling between the core network node 16 and a UE 10 for the first network slice.

The core network node 16 is further configured to, e.g. by means of an adapting module 1104 and/or the processing unit 1101 being configured to, adapt parameters of the requested resources for the first network slice based on the received indication of the reason for the requested resources of the first network slice not corresponding to the SLA.

The core network node 16 is further configured to, e.g. by means of the transmitting module 1102 and/or the processing unit 1101 being configured to, transmit, to the RAN node 12, a second information regarding the adapted requested resources for the first network slice associated.

The core network node 16 further comprises a memory 1105. The memory comprises one or more units to be used to store data on, such as, system information, IDLE mode mobility information, network slice information, wireless device IDs, network slice and roaming policies, Slice IDs, applications to perform the methods disclosed herein when being executed, and similar.

The methods according to the embodiments described herein for the core network node 16 are respectively implemented by means of e.g. a computer program 1104 or a computer program product, comprising instructions, i.e., software code portions, which, when executed on at least one processor, cause the at least one processor to carry out the actions described herein, as performed by the core network node 16. The computer program 1104 may be stored on a computer-readable storage medium 1105, e.g. a disc or similar. The computer-readable storage medium 1105, having stored thereon the computer program, may comprise the instructions which, when executed on at least one processor, cause the at least one processor to carry out the actions described herein, as performed by the core network node 16. In some embodiments, the computer-readable storage medium may be a non-transitory computer-readable storage medium.

Although the embodiments described herein discloses that "allowed functionality, features and/or parameter settings" are described in the SLA, comprised in the SLA database and supervised by the RAN node 12 and/or the supervisor 122, this shall only be seen as an example. In other embodiments which are equally applicable, "blacklisted functionality, features and/or parameter settings" may be used in the SLA instead. Thereby e.g. certain parameter settings may be explicitly prohibited. This can provide similar possibilities as the embodiments with allowed functionality, features and/or parameter settings, but with a different amount of configuration.

Although embodiments herein focus on SLA verification for the purpose of maintaining a business relationship between two different operators, there are also other scenarios in which this functionality may be beneficial. One example is security, wherein e.g. an SLA limit of a maximum number of connection requests or simultaneous connections may be used in order to defend the network against certain types of denial of service (DoS) attacks.

As will be readily understood by those familiar with communications design, the description applied to a 'cell' is equally applicable to all UE-based mobility, such as e.g. selection and re-selection, in NR even if the concept/term 'cell' is replaced by a corresponding concept/term such as e.g. a beam, a beam group or service area, which describes a geographical area covered by a RAN node.

Embodiments herein relate to a communication network with network slices, i.e. a core network and/or RAN network, with partitioned sets of functionalities wherein the core network node 16, the wireless device 10 and/or the RAN node 12 may support the first set of functionalities out of the total set of functionalities in the network of the communication network. The first set of functionalities belongs to the first network slice of the network, and is separated from another set of functionalities out of the total set of functionalities in the network.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of for example a network node.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network nodes will appreciate the cost, performance, and maintenance trade-offs inherent in these design choices.

Although the embodiments herein are described for an LTE-like architecture it shall be noted that they are equally applicable to any architecture based on an evolution of the S1 interface.

When using the word "comprise" or "comprising" it shall be interpreted as non-limiting, i.e. meaning "consist at least of". When using the word "set" herein, it shall be interpreted as meaning "one or more".

In the embodiments herein, being associated with shall be interpreted as somehow being related to, this may e.g. be the wireless device 10 camping on or being connected to a cell which has support for the network and the network slice and/or the wireless device having local information regarding the network and the network slice, such as e.g. having locally stored the network as a home network indicated with a HPLMN and the network slice being stored as a home network slice supporting the wireless device in the home network.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method, performed by a Radio Access Network (RAN) node, for managing communication on a first network slice in a communications network, wherein the communications network comprises partitioned sets of functionalities, wherein a first set of functionalities belongs to the first network slice, wherein the first set of functionalities is at least partly separated from another set of functionalities out of a total set of functionalities in the communications network, the method comprising:
  receiving, from a Core Network (CN) node, information regarding requested resources for a first network slice identified by a network slice identifier;
  determining that the received information does not correspond to a Service Level Agreement (SLA) for the first network slice, wherein the determining comprises comparing control plane signaling and traffic data for the first network slice to the SLA for the first network slice; and wherein the control plane signaling comprises control plane signaling between the CN node and the UE for the first network slice, and wherein the received information comprises the information regarding the control plane signaling.

2. The method of claim 1, further comprising adapting a parameter of the requested resources for the first network slice to a value corresponding to the SLA for the first network slice.

3. The method of claim 1, further comprising reconfiguring one or more radio bearers associated with the first network slice, in order for the received information regarding requested resources for the first network slice to correspond to the SLA for the first network slice.

4. The method of claim 1, further comprising transmitting a rejection of the requested resources to the CN node, the rejection comprising an indication of a reason for requested resources of the first network slice not corresponding to the SLA.

5. The method of claim 4, wherein the reason for not corresponding is:
the UE not being allowed in the first network slice;
an overload in the first network slice;
an overload in a second network slice; and/or
a limit of a parameter specified in the SLA being reached.

6. The method of claim 1, wherein the control plane signaling comprises control plane signaling between the CN node and the RAN node for the first network slice, and wherein the received information comprises the information regarding the control plane signaling.

7. The method of claim 1, wherein the SLA is stored in an SLA database.

8. A method, performed by a Core Network (CN) node, for managing communication on a first network slice in a communications network, wherein the communications network comprises partitioned sets of functionalities, wherein a first set of functionalities belongs to the first network slice, wherein the first set of functionalities is at least partly separated from another set of functionalities out of a total set of functionalities in the communications network, the method comprising:
transmitting, to a Radio Access Network (RAN) node, first information regarding requested resources for a first network slice identified by a network slice identifier, wherein the first information comprises information regarding control plane signaling and traffic data for the first network slice;
receiving, from the RAN node, a rejection of the requested resources, wherein the rejection indicates that the transmitted information does not correspond to the SLA, and wherein the rejection further comprises an indication of a reason for requested resources of the first network slice not corresponding to the SLA;
adapting parameters of the requested resources for the first network slice based on the received indication of the reason for the requested resources of the first network slice not corresponding to the SLA;
transmitting, to the RAN node, second information regarding the adapted requested resources for the first network slice.

9. The method of claim 8, wherein the control plane signaling comprises control plane signaling between the CN node and the RAN node for the first network slice, and wherein the first information comprises the information regarding the control plane signaling.

10. The method of claim 8, wherein the control plane signaling comprises control plane signaling between the CN node and a UE for the first network slice, and wherein the first information comprises the information regarding the control plane signaling.

11. A Radio Access Network (RAN) node for managing communication on a first network slice in a communications network, wherein the communications network comprises partitioned sets of functionalities, wherein a first set of functionalities belongs to the first network slice, wherein the first set of functionalities is at least partly separated from another set of functionalities out of a total set of functionalities in the communications network, the RAN node comprising:
processing circuitry;
memory containing instructions executable by the processing circuitry whereby the RAN node is operative to:
receive, from a Core Network (CN) node, information regarding requested resources for a first network slice identified by a network slice identifier;
determine that the received information corresponds to a Service Level Agreement (SLA) for the first network slice based on comparing control plane signaling and traffic data for the first network slice to the SLA for the first network slice; and
wherein the control plane signaling comprises control plane signaling between the CN node and a User Equipment (UE) for the first network slice, and wherein the received information comprises the information regarding the control plane signaling.

12. The RAN node of claim 11, wherein the instructions are such that the RAN node is operative to adapt a parameter of the requested resources for the first network slice to a value corresponding to the SLA for the first network slice.

13. The RAN node of claim 11, wherein the instructions are such that the RAN node is operative to reconfigure one or more radio bearers associated with the first network slice, in order for the received information regarding requested resources for the first network slice to correspond to the SLA for the first network slice.

14. The RAN node of claim 11, wherein the instructions are such that the RAN node is operative to transmit a rejection of the requested resources to the CN node, the rejection comprising an indication of a reason for requested resources of the first network slice not corresponding to the SLA.

15. The RAN node of claim 14, wherein the reason for not corresponding is:
the UE not being allowed in the first network slice;
an overload in the first network slice;
an overload in a second network slice; and/or
a limit of a parameter specified in the SLA being reached.

16. The RAN node of claim 11, wherein the control plane signaling comprises control plane signaling between the CN node and the RAN node for the first network slice, and wherein the received information comprises the information regarding the control plane signaling.

17. A Core Network (CN) node for managing communication on a first network slice in a communication network, wherein the communication network comprises partitioned sets of functionalities, wherein a first set of functionalities belongs to the first network slice, wherein the first set of functionalities is at least partly separated from another set of functionalities out of a total set of functionalities in the communication network, the CN node comprising:
processing circuitry;
memory containing instructions executable by the processing circuitry whereby the CN node is operative to:

transmit, to a Radio Access Network (RAN) node, first information regarding requested resources for a first network slice identified by a network slice identifier, wherein the first information comprises information regarding control plane signaling and traffic data for the first network slice;

receive, from the RAN node, a rejection of the requested resources, wherein the rejection indicates that the transmitted information does not correspond to the SLA, and wherein the rejection further comprises an indication of a reason for requested resources of the first network slice not corresponding to the SLA;

adapt parameters of the requested resources for the first network slice based on the received indication of the reason for the requested resources of the first network slice not corresponding to the SLA;

transmit, to the RAN node, second information regarding the adapted requested resources for the first network slice.

18. The CN node of claim 17, wherein the control plane signaling comprises control plane signaling between the CN node and the RAN node for the first network slice, and wherein the first information comprises the information regarding the control plane signaling.

19. The CN node of claim 17, wherein the control plane signaling comprises control plane signaling between the core network node and a UE for the first network slice, and wherein the first information comprises the information regarding the control plane signaling.

* * * * *